(12) United States Patent  
Amidon

(10) Patent No.: US 8,175,547 B1
(45) Date of Patent: *May 8, 2012

(54) DISPOSABLE CHEMICAL SENSOR AND WIRELESS COMMUNICATION DEVICE

(75) Inventor: Charles Philip Amidon, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 371 days.

This patent is subject to a terminal disclaimer.

(21) Appl. No.: 12/460,178

(22) Filed: Jul. 10, 2009

Related U.S. Application Data

(63) Continuation-in-part of application No. 11/183,314, filed on Jul. 15, 2005, now Pat. No. 7,577,405.

(51) Int. Cl.
*H04B 1/38* (2006.01)
*H04M 1/00* (2006.01)
*H04M 11/04* (2006.01)

(52) U.S. Cl. ............. 455/90.1; 455/90.3; 455/575.1; 455/404.1

(58) Field of Classification Search ............ 455/404.1, 455/404.2, 90.1, 575.1
See application file for complete search history.

(56) References Cited

U.S. PATENT DOCUMENTS

| | | | | | |
|---|---|---|---|---|---|
| 4,763,307 | A * | 8/1988 | Massa | ............... | 367/174 |
| 5,588,398 | A * | 12/1996 | Allen et al. | ............... | 119/822 |
| 5,946,610 | A * | 8/1999 | Hama | ............... | 455/351 |
| 6,244,375 | B1 * | 6/2001 | Norris et al. | ............... | 181/102 |
| 6,285,893 | B1 * | 9/2001 | Keirinbou | ............... | 455/575.7 |
| 6,525,762 | B1 * | 2/2003 | Mileski et al. | ............... | 348/81 |
| 6,957,092 | B2 * | 10/2005 | Kotzin | ............... | 455/575.8 |
| 7,577,405 | B1 * | 8/2009 | Amidon | ............... | 455/90.1 |
| 2001/0055544 | A1 * | 12/2001 | Copp | ............... | 422/98 |

\* cited by examiner

*Primary Examiner* — Tilahun B Gesesse
(74) *Attorney, Agent, or Firm* — James M. Kasischke; Jean-Paul A. Nasser; Michael P. Stanley

(57) ABSTRACT

A disposable sensor device for remote sensing of conditions such as temperature and dangerous gasses includes a body defining an enclosed chamber, a power source mounted in the chamber, an on-off switch mounted on and accessible from outside the body, a processor mounted in the chamber and powered by the power source, sensors mounted on the exterior of the body in communication with the processor and capable of detecting gasses and temperature. A transceiver, a speaker, and a microphone are mounted in the chamber and in communication with the processor. The transceiver is adapted to receive sound signals from a remote unit and input the signals to the speaker for broadcast, and the microphone is adapted to receive sound signals from outside the body and input the received sound signals to the processor for transmittal to the remote unit.

3 Claims, 1 Drawing Sheet

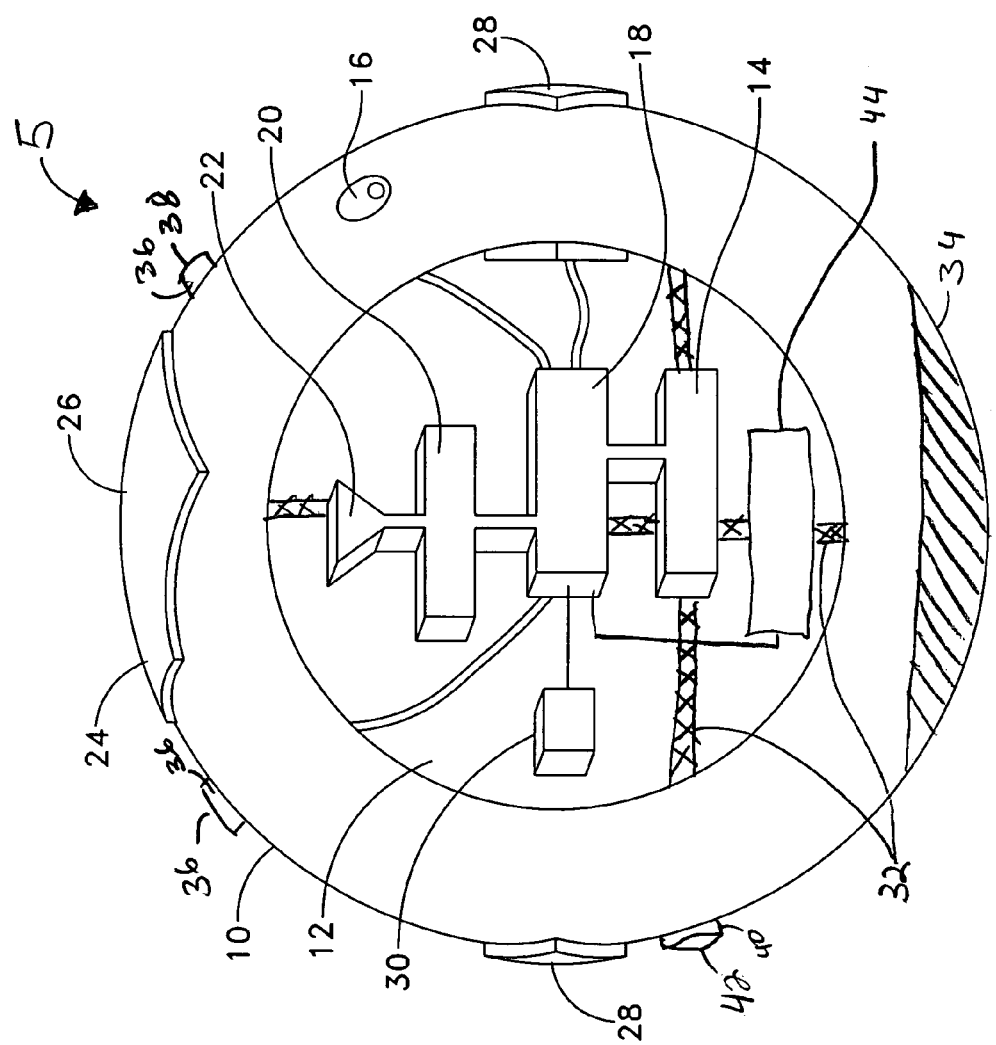

DISPOSABLE CHEMICAL SENSOR AND WIRELESS COMMUNICATION DEVICE

This application is a continuation in part of the prior filed, non-provisional application Ser. No. 11/183,314, filed Jul. 15, 2005 now U.S. Pat. No. 7,577,405. This application repeats a substantial portion of prior filed application Ser. No. 11/183,314, filed Jul. 15, 2005, and adds and claims additional disclosure not present in the prior filed application.

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The invention relates to chemical sensor devices and is directed more particularly to a disposable chemical sensor and temperature device which may be dropped into building rubble or other such areas not readily accessible by rescue personnel, to test the environment in the rubble.

(2) Description of the Prior Art

The need for this invention is driven by the inability to determine the safety of the environment under the rubble of a collapsed building or other structure prior to initiating rescue operations. There have been experiments with disposable microphones and cameras which may be dropped into the rubble of collapsed buildings, and the like, to aid search and rescue teams to hear survivors over the surface noise levels caused by heavy lift cranes, air hammers, bull dozers, and large numbers of rescue workers.

It has become apparent that there is a need for disposable devices of similar nature, but which are adapted for wireless two-way communication and control to obtain information concerning the environment prior to disturbing an area under the rubble and gives an indication of the likelihood that the area is a candidate for finding survivors. In addition, it would provide two-way communication between a survivor trapped in the rubble and a surface rescue worker, such that a survivor can be alerted to the fact that he should presently make a sound and can react in a manner to make known his/her presence.

SUMMARY OF INVENTION

An object of the invention is, therefore, to provide a disposable wireless two-way radio device which may be dropped into a rubble pile and which, by its weight and shape, will tend to drop down well into the rubble before coming to rest.

A further object of the invention is to provide such a device adapted to broadcast a voice message or other signal from a rescue worker at the surface to a location in which the device has come to rest, and to transmit any voice or other message detected by the device back to the rescue worker.

A further object of the invention is to provide such a device adapted to remote sensing of conditions such as temperature and dangerous or toxic chemical gasses.

With the above and other objects in view, a feature of the invention is the provision of a disposable radio communication, chemical sensor and temperature sensor device comprising a body defining an enclosed chamber, a power source mounted in the chamber, an on-off switch mounted on the body and accessible from outside the body, a processor mounted in the chamber and powered by the power source, a transceiver mounted in the chamber and in communication with the processor, a temperature sensor mounted on the exterior of the body and in communication with the processor, and one or more chemical sensors mounted on the exterior of the body and in communication with the processor. A speaker is mounted in the body and is provided with a face portion substantially co-extensive with an outer surface of the body, the speaker being in communication with the processor, and a microphone is mounted in the body and in communication with the processor. The transceiver is adapted to receive a voice signal or other sound signal, from a remote unit and input the signal to the speaker for broadcast, and the microphone is adapted to receive a sound signal from outside the body and input the received signal to the processor for transmittal by the transceiver to the remote unit.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawing in which is shown an illustrative embodiment of the invention from which its novel features and advantages will be apparent, and wherein:

FIG. 1 is a diagrammatic side elevational and broken-away view of a disposable chemical sensor device illustrative of an embodiment of the invention.

DETAILED DESCRIPTION OF THE INVENTION

Referring to FIG. 1, there is illustrated a disposable chemical sensor and wireless communication device 5 representing an embodiment of the invention including a body 10, preferably of a spherical configuration designed to be rugged enough to with stand impacts and other crushing forces, defining an enclosed chamber 12. In a preferred embodiment the body is made of a hard metal such as titanium or metal alloy such as titanium and steel, and is reinforced with internal supports 32 of the same material. The body is weighted 34 to keep it oriented in a particular spatial plane.

A power source 14 is mounted in the chamber 12 and may comprise one or more dry cell batteries. A processor on-off switch 16 is mounted on the body 10 and is accessible from outside of the body to turn on a digital processor 18 which, when turned on, is powered by the power source 14. The processor 18 serves as a controller of the constituent parts of the disposable chemical sensor and wireless communication device 5 and can receive data from the parts as input. A transceiver 20 is in communication with the processor 18 and is provided with an antenna 22 for communications between the transceiver 20 and a remote unit (not shown).

A broadcast speaker 24 is mounted on the body 10 and is provided with a face portion 26 which is substantially co-extensive with the spherical surface of the body 10. The speaker 24 is in communication with and controlled by the processor 18. A chemical sensor 36 capable of detecting toxic chemicals is mounted on the body 10 and is provided with a face portion 38 which is substantially co-extensive with the spherical surface of the body 10. The chemical sensor 36 is in communication with and controlled by the processor 18. A temperature sensor 40 is mounted on the body 10 and is provided with a face portion 42 which is substantially co-extensive with the spherical surface of the body 10. The temperature sensor 40 is in communication with the processor 18.

At least once microphone 28, and preferably a plurality of microphones of the type shown in FIG. 1, is mounted on the body 10. The microphones 28 are in communication with the processor 18.

The transceiver 20 is adapted to receive a voice signal from a remote unit (not shown) and input the signal to the processor 18 and thence to the speaker 24 for broadcast. The microphones 28 are adapted to receive any voice or other sound message from outside the body 10 and input the received message to the processor 18 for transmittal by the transceiver 20 to the remote unit. The broadcast signal may be from a rescue worker at the remote unit, or a recording, urging survivors to utter or tap out a sound. The sound signal is typically a voice message, but may be a metallic "ping", or hand clap, or any other noise which a survivor is capable of producing.

An orientation sensor 30 is disposed in the chamber 12 and is in communication with the processor 18 for providing to the rescue worker an indication as to the direction from which a voice or other sound signal reaches the body 10. In an alternative embodiment, a motorized weight displacement system 44 will shift the weighting of the body to cause it to move in a desired direction if the device should come to rest in an undesirable location.

In operation, the switch 16 is moved by an operator to the "on" position which starts operation of the processor 18, which draws power from the power source 14. The body 10 is dropped into a void in a rubble area. Because of the shape and weight of the body, it tends to roll and bounce through openings in the rubble until coming to a stop. Upon receipt of a voice message from a rescue worker at a remote site, the speaker 24 begins broadcasting the message into the surrounding rubble. The processor 18 continues operation of the speaker 24, the transceiver 20, and the microphones 28 as long as there is power provided by the power source 14. At the same time, one or more chemical sensors 38 and the temperature sensor 40 are attempting to detect any potential toxic gases and measure the temperature of the surrounding environment in the rubble of the collapsed building. In practice, a number of the devices 5 are tossed into a rubble pile, all in communication with the remote unit.

There is thus provided a disposable chemical sensor and wireless communication device 5 which may be dropped into a rubble pile and which tends to drop deep into the pile, and which sends any sounds emanating from the area surrounding the device to a remote station for alerting rescue workers to the presence of a survivor and detects the presence of toxic gaseous chemicals and the temperature of the surrounding environment.

The broadcast message would be of the sort urging any survivor hearing the message to make a voice noise or any other kind of noise the survivor is capable of generating.

Any such response to the broadcast message is picked up by one of the microphones 28 and is routed by the processor 18 to the transceiver 20, which sends the response to the remote unit, alerting rescue personnel to the presence of one or more survivor in a given area. The orientation sensor 30 provides an indication as to the attitude of the body 10, whether right side up, upside down, or the like. The processor 18 and transceiver 20 provide an indication as to which microphone 28 has received the most pronounced signal. The rescue workers, knowing roughly the location of the body 10, are thereby enabled to start a search in the likeliest location of a survivor. The chemical sensor 36 and temperature sensor 40 provide information concerning the environment to the processor 18 which then transmits the information via the transceiver 20 to the rescue workers at the remote unit.

It will be understood that many additional changes in the details, materials, and arrangement of parts, which have been herein described and illustrated in order to explain the nature of the invention, may be made by those skilled in the art within the principles and scope of the invention as expressed in the appended claims.

What is claimed is:

1. A disposable chemical sensor and wireless communication device to be used in conjunction with a remote unit for allowing at least one rescue worker to communicate with at least one person trapped in a rubble pile of a collapsed building, and for evaluating the environment within said collapsed building, comprising:

a body defining an enclosed chamber substantially spherical in configuration allowing said body to roll and bounce wherein said body is rugged enough to withstand impacts and other crushing forces, and wherein said body is weighted;

a power source mounted in the chamber comprising at least one dry cell battery;

an processor on-off switch mounted on said body and accessible from outside said body;

a processor mounted in the chamber and powered by said power source;

a transceiver mounted in the chamber and in communication with said processor;

an antenna extending from said transceiver and disposed in the chamber for receiving a signal from a remote unit and for transmitting a sound signal to said remote unit;

a speaker mounted in said body and in communication with said processor, wherein said speaker is a broadcast speaker having a face portion that is substantially co-extensive with the spherical surface of the body;

a plurality of microphones mounted in said body and in communication with said processor;

at least one chemical sensor mounted on said body and in communication with said processor, wherein said chemical sensor has a face portion that is substantially co-extensive with the spherical surface of the body and is capable of detecting toxic chemical gasses;

at least one temperature sensor mounted on said body and in communication with said processor, wherein said temperature sensor has a face portion that is substantially co-extensive with the spherical surface of the body and is capable of detecting the thermal conditions surrounding said body;

wherein said transceiver is adapted to receive a sound signal from a remote unit and input the signal to said speaker for broadcast, and said microphone is adapted to receive a sound signal from outside said body and input the received signal to said processor for transmittal by said transceiver to the remote unit;

wherein said transceiver is adapted to receive a broadcast sound signal from a remote unit via said antenna;

wherein said broadcast sound signal comprises vocal instructions urging said at least one person trapped in a rubble pile of a collapsed building to generate a sound message, wherein said transceiver transmits the broadcast sound signal by inputting the broadcast sound signal to said processor and thence to said speaker for broadcast, and wherein said microphones are adapted to receive any sound message from outside the body and input the received sound message to the processor for transmittal by the transceiver to the remote unit, thereby alerting a rescue worker to the presence of a survivor, whereby said processor and transceiver provides an indication as to which of said plurality of microphones has received any sound message, whereby said processor and transceiver provides an indication as to which of said plurality of microphones has received any broadcast sound message; and an orientation sensor in communication with said processor for providing an indication as to the direction of a sound message generated by an at least one person trapped in a rubble pile of a collapsed building.

2. The device of claim 1, wherein said body is of a size that is small enough to allow it to be dropped down well into a rubble pile of a collapsed building and further comprises internal supports to prevent the enclosed chamber from being crushed.

3. The device of claim 1, further comprising a motorized weight displacement system contained in said body and in communication and controlled by said processor for the purpose of shifting the weighting of the body to cause it to move in a desired direction if the device should come to rest in an undesirable location.

* * * * *